United States Patent [19]

Espy et al.

[11] 3,951,921
[45] Apr. 20, 1976

[54] CATIONIC WATER SOLUBLE RESINOUS REACTION PRODUCT OF POLYAMINOPOLYAMIDE-EPICHLOROHYDRIN AND NITROGEN COMPOUND

[75] Inventors: Herbert H. Espy, Fairfax; Stearns T. Putnam, Wilmington, both of Del.

[73] Assignee: Hercules Incorporated, Wilmington, Del.

[22] Filed: Oct. 7, 1974

[21] Appl. No.: 512,768

Related U.S. Application Data

[63] Continuation of Ser. No. 334,338, Feb. 21, 1973, abandoned.

[52] U.S. Cl. ............................ 260/78 SC; 162/168; 210/54; 260/29.2 EP; 260/29.2 N; 260/65; 260/77.5 C; 260/78 UA; 260/79.3 A; 260/79.3 R; 260/80 R; 526/23; 526/49; 526/303
[51] Int. Cl.² .................................... C08G 69/48
[58] Field of Search ..... 260/78 SC, 29.2 N, 29.2 EP

[56] References Cited
UNITED STATES PATENTS

| | | | |
|---|---|---|---|
| 3,224,990 | 12/1965 | Babcock | 260/78 SC |
| 3,239,491 | 3/1966 | Tsou et al. | 260/78 SC |
| 3,442,754 | 5/1969 | Espy | 260/78 SC |
| 3,583,948 | 6/1971 | Blechinger | 260/78 SC |
| 3,632,559 | 1/1972 | Matter et al. | 260/78 SC |
| 3,642,572 | 2/1972 | Endres et al. | 260/78 SC |

*Primary Examiner*—Harold D. Anderson
*Attorney, Agent, or Firm*—Charles L. Board; Edith A. Rice

[57] ABSTRACT

Disclosed are novel retention aid resins for paper fillers, said resins being derived by reaction of a nitrogen compound (such as ammonia) and a base resin which is the reaction product of an amino polymer and an epoxide difunctional toward amines. A specific example of such a base resin is a cationic, water-soluble a-minopolyamide-epichlorohydrin resin.

9 Claims, No Drawings

CATIONIC WATER SOLUBLE RESINOUS REACTION PRODUCT OF POLYAMINOPOLYAMIDE-EPICHLOROHYDRIN AND NITROGEN COMPOUND

This is a continuation of application Ser. No. 334,338, filed Feb. 21, 1973, now abandoned.

This invention relates to novel essentially nonthermosetting retention aid resins for paper fillers.

Cationic, water-soluble, thermosetting resins derived by the reaction of amino polymers with epichlorohydrin are well-known wet-strength agents for paper. Typical of these wet-strength agents are the resins of U.S. Pat. No. 2,926,154 to G. I. Keim, which discloses resins derived by the reaction of epichlorohydrin and an aminopolyamide derived from a polyalkylene polyamine and a dicarboxylic acid. In the wet-strength resin art the amino polymers derived from a polyalkylene polyamine and a dicarboxylic acid are known as polyaminopolyamides and are sometimes referred to as "aminopolyamides" and "polyamides." Other patents which describe cationic, thermosetting, wet-strength resins for paper include U.S. Pat. Nos. 3,224,990; 3,240,664; 3,332,901; and 3,700,623.

According to the teachings of U.S. Pat. No. 3,224,990, an aminopolyamide derived from diethylene triamine and adipic acid is reacted with epichlorohydrin and ammonium hydroxide in a molar ratio of aminopolyamide to ammonium hydroxide to epichlorohydrin of 1.0:0.5:2.5. The aminopolyamide and ammonium hydroxide are premixed before reaction with epichlorohydrin or the epichlorohydrin and ammonia can be prereacted before mixing with the aminopolyamide. Under the conditions disclosed in U.S. Pat. No. 3,224,990, the aminopolyamide the ammonium hydroxide each react with and consume the epichlorohydrin at similar rates. if the ammonium hydroxide and epichlorohydrin are prereacted before addition to the aminopolyamide, somewhat more of the epichlorohydrin may react with the ammonium hydroxide than otherwise, but at least some will be present to react with the aminopolyamide. The resin of U.S. Pat. No. 3,224,990 is a cationic thermosetting resin which has utility as a wet-strength agent for paper.

The above cationic resins are thermosetting which makes them particularly adapted for use as wet-strength agents for paper when added to the pulp slurry prior to sheet formation. At the same time, they can function as retention aids for fillers present in the pulp slurry. Wet strength is not always desirable in a filled paper. The presence of the thermosetting resin makes reworking of broke difficult. Thus, is it desirable to have available a retention aid resin for fillers which does not impart wet-strength properties to the paper.

In accordance with this invention, there are provided novel cationic resins which are essentially non-thermosetting and which are efficient retention aid resins for paper fillers, but which impart little, if any, wet-strength properties to the paper.

The retention aid resins of this invention are aminohydroxyalkyl amino polymers and aminohydroxyalkyl quaternary ammonium polymers produced by reacting (1) a nitrogen-containing compound having the formula RRR'N wherein each R is independently selected from hydrogen and $C_1$–$C_4$ alkyl and R' is selected from hydrogen, $C_1$–$C_4$ alkyl and hydroxyl, with (2) certain base resins derived by reaction of a polymer containing a plurality of secondary and/or tertiary amino groups and an epoxide difunctional toward amines such, for example, as epichlorohydrin; 1,2:3,4-diepoxybutane; 1,2:5,6-diepoxyhexane; diglycidyl ether; and 3,4-epoxy-(epoxyethyl) cyclohexane. The base resins employed in this invention will be detailed more fully hereinafter.

Specific nitrogen-containing compounds (hereafter called "nitrogen compounds") which can be used in this invention include ammonia; methylamine; dimethylamine; trimethylamine; ethylamine; diethylamine; triethylamine; propylamine; dipropylamine; tripropylamine; isopropylamine; diisopropylamine; triisopropylamine; butylamine; dibutylamine; tributylamine; isobutylamine; diisobutylamine; triisobutylamine; t-butylamine; di-t-butylamine; N-ethyl-N-methylpropylamine; N,N-dimethyl-ethylamine; N,N-diethyl-propylamine; N,N-dimethyl-isopropylamine; N-ethyl-N-isopropyl-butylamine; N-ethyl-N-propyl-t-butylamine; N-methyl-N-ethyl-isobutylamine; N-methyl-propylamine; N-ethyl-propylamine; N-propyl-t-butylamine; N-ethyl-dipropylamine; N-methyl-diethylamine; N-propyl-di-t-butylamine; N-methyl-ethylamine; N-ethyl-butylamine; N-hydroxy-methylamine; N-hydroxy-dimethylamine; hydroxylamine; N-hydroxyl-N-methylpropylamine; N-hydroxy-N-methyl-t-butylamine; N-hydroxy-N-methylethylamine; N-hydroxy-diisopropylamine; N-hydroxy-diethylamine; and N-hydroxy-ethylamine.

In preparing the resins of this invention the reaction of the base resin and the nitrogen compound is carried out in a liquid medium (liquid at reaction temperature) that is a solvent for both reactants and that is inert to the reactants and reaction product. Reaction is carried out preferably in an aqueous medium. The solids concentration of the base resin in the reaction medium prior to reaction will be, by weight, from about 1% to about 25%, preferably from about 6% to about 15%. Reaction can be carried out at temperatures of from about 0°C. to about 150°C., and higher if desired. Preferred temperatures will be in the range of from about 50°C. to about 100°C. Reaction can be carried out under pressure or at atmospheric pressure. Temperatures above the boiling point of the reaction mixture will require that the reaction be carried out under pressure.

Reaction is carried out until substantially all the moieties of the base resin derived from the difunctional epoxide (referred to hereafter and in the claims as "epoxide moieties") have reacted with the nitrogen compound and the resulting resin has little, if any, thermosetting properties. The time of reaction varies inversely with temperature. Thus, for example, at 50°C., time of reaction will be from about ½ to 3 hours and at 100°C., about 1 minute to about 10 minutes.

The amount of nitrogen compound employed will be at least stoichiometrically equivalent (and preferably in substantial excess) of the amount of epoxide moiety of the base resin to provide for essentially complete reaction of all epoxide moieties with the nitrogen compound. Undesirable gelation of the reaction mass can occur in carrying out the reaction of this invention. Thus, to substantially eliminate this possibility, an amount of nitrogen compound in substantial excess of stoichiometric is employed, preferably from about 2 times to about 40 times the stoichiometric amount. The amount of nitrogen compound required to avoid gelation will vary directly with the base resin solids concentration of the reaction mixture. It is well within the skill of those versed in the art, having before them the teachings of this invetnion, to produce, without undue experimentation, the retention aid resins of this invention so as to avoid undesirable gelation. Any unreacted nitrogen compound can be left in the resulting resin solution, or if desired, it can be removed from the resin solution by known means such as by heating under atmospheric or reduced pressure. The unreacted nitrogen compound thus removed can be recovered and reused, if desired.

The novel retention aid resins of this invention can be employed as retention aids for a wide variety of paper fillers such as calcium carbonate, various clays (kaolin for example) and titanium dioxide. The retention aid resin is generally added to the pulp-filler slurry just prior to sheet formation in an amount from about 0.002% to about 1.0% by weight, based on the weight of the dry pulp. It may, however, be added at an earlier point in the papermaking system. The novel retention aid resins of this invention can be employed in alum-containing systems and in alumfree systems.

Retention Aid Resins Derived from an Aminopolyamide--epichlorohydrin Base Resin and Nitrogen Compound In accordance with one aspect of this invention, retention aid resins are derived by reaction of a nitrogen compound and an aminopolyamide--epichlorohydrin thermosetting resin. Water-soluble aminopolyamide--epichlorohydrin thermosetting resins are well known in the paper art. Examples of certain aminopolyamide--epichlorohydrin thermosetting resins are disclosed and described in U.S. Pat. No. 2,926,154, reference to which is hereby made. An aminopolyamide is first prepared by reacting a dicarboxylic acid with a polyalkylene polyamine under such conditions as to produce a long chain aminopolyamide.

Suitable dicarboxylic acids that can used to prepare the aminopolyamide include diglycolic acid and the saturated aliphatic dicarboxylic acids containing from 4 through 12 carbon atoms, such as succinic acid, glutaric acid, adipic acid, pimelic acid, suberic acid, azelaic acid, sebacic acid, methyl adipic acid, and methyl glutaric acid.

Other suitable dicarboxylic acids include the aromatic acids such as terephthalic acid, isophthalic acid, and phthalic acid; and alpha-beta-unsaturated dicarboxylic acids such as maleic acid, fumaric acid, itaconic acid, glutaconic acid, citraconic acid, and mesaconic acid.

The available anyhydrides of the above acids can be used in preparing the aminopolyamide. The amides of the above acids can also be used to prepare the aminopolyamide. Esters of the above acids can be employed in preparing the aminopolyamide, if desired. Another ester that can be used is an ester of malonic acid, such as, for example, dimethyl malonate, diethyl malonate, and dipropyl malonate. Mixtures of any two or more of the above reactants can be used to prepare the aminopolyamides. Thus, for example, a mixture of two different acids can be used; a mixture of two different anhydrides can be used; a mixture of two different esters can be used; a mixture of two different amides can be used; a mixture of at least one acid and at least one ester can be used; a mixture of at least one anhydride and at least one acid can be used; and a mixture of at least one acid, at least one anhydride, and at least one ester can be used.

The polyalkylene polyamine employed can be represented by the formula

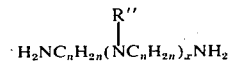

wherein $R''$ is hydrogen, $C_1$–$C_{12}$ alkyl, or $C'1$–$C_{12}$ hydroxyalkyl; $n$ is an integer 2 through 6 and $x$ is an integer 1 through 4. Examples of $C_1$–$C_{12}$ alkyl are methyl, ethyl, butyl, hexyl and dodecyl. Examples of $C_1$–$C_{12}$ hydroxyalkyl are hydroxyethyl, 2-hydroxypropyl, 2-hydroxybutyl and 2-hydroxydodecyl.

Specific examples of polyalkylene polyamines of the above formula that can be employed include diethylenetriamine, triethylenetetramine, tetraethylene pentamine, dipropylenetriamine, dihexamethylenetriamine, pentaethylenehexamine, iminobis(propylamine), and methyl bis(3-aminopropyl)amine.

Other polyalkylene polyamines that can be employed and which are not included in the above formula include 1,4-bis(3-aminopropyl)piperazine and 1-(2-aminoethyl)piperazine. Mixtures of two or more polyalkylene polyamines can be used if desired.

The spacing of the amine nitrogens in the aminopolyamide can be increased, if desired. This can be accomplished by substituting a diamine such as ethylenediamine, 1,3-diaminopropane, 1,2-diaminopropane, hexamethylenediamine, aminoethylethanolamine and the like for a portion of the polyalkylene polyamine. For this purpose, up to about 80% of the polyalkylene polyamine can be replaced by a molecularly equivalent amount of diamine. Usually a replacement of about 50% or less will be adequate.

Temperatures employed in carrying out reaction between the dicarboxylic acid and the polyalkylene polyamine can vary from about 50°C. to about 250°C. or higher at atmospheric pressure. Temperatures between about 80°C. and 210°C. are preferred. Lower temperatures can be employed by using reduced pressure. Time of reaction will be from about ½ hour to 4 hours and will vary inversely with temperature.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used.

The aminopolyamide is reacted with epichlorohydrin at a temperature of from about 45°C. to about 100°C. and preferably between about 45°C. and 70°C. until the viscosity of a 15% solids solution in water at 25°C. has reached about A or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to 50%.

In preparing the aqueous reaction medium for the epichlorohydrin--aminopolyamide reaction, it is desirable that essentially all the aminopolyamide be dissolved therein. A water-miscible alcohol such, for example, as methanol, ethanol, propanol, isopropanol, and t-butanol, can be added to the aqueous medium to complete dissolution of those aminopolyamides that are not completely water-soluble. The amount of alcohol employed will be that required to provide for substantially complete dissolution of the aminopolyamide and is within the skill of the art.

In the aminopolyamide--epichlorohydrin reaction, epichlorohydrin is employed in amounts of from about 0.1 mole to about 2 moles for each secondary or tertiary amine group of the aminopolyamide, and preferably from about 1 mole to about 1.5 moles.

Thus, the aminopolyamide--epichlorohydrin reaction product is derived by reacting the aminopolyamide with epichlorohydrin in a mole ratio of epichlorohydrin to amine groups (secondary or tertiary) of said aminopolyamide of from about 0.1 mole to about 2 moles to form a water-soluble aminopolyamide--epichlorohydrin base resin.

The reaction of the nitrogen compound with the aminopolyamide--epichlorohydrin base resin preferably is carried out in an aqueous medium which can be the same reaction medium as used for the reaction of epichlorohydrin with aminopolyamide. The reaction with the nitrogen compound can be carried out as soon as the reaction of epichlorohydrin with aminopolyamide is substantially complete.

If the base resin solution is to be stored for any length of time prior to reaction with the nitrogen compound, it can be stabilized against gelation by adjusting the pH thereof to about 6 or below by addition of a water-soluble acid such as hydrochloric acid and sulfuric acid. Reaction with the nitrogen compound to produce the retention aid resins of this invention, is carried out at a pH above 7, preferably at about 8 or above. If desired, part of the excess nitrogen compound can be used to make the necessary pH adjustment.

The following examples are illustrative of this aspect of the invention. In these examples all parts and percentages are by weight unless otherwise specified.

EXAMPLE 1

A stirred mixture of 200 parts of diethylenetriamine and 290 parts of adipic acid is heated to 170°–175°C. for 1.5 hours with evolution of water, cooled to 140°C. and diluted to 50% solids with about 400 parts of water. the resulting aminopolyamide has a reduced specific voscosity (RSV) = 0.16 (defined as nsp/C in 1 molar aqueous $NH_4Cl$ at 25°C. at C = 2 g./100 ml.), 100 parts of the 50% solids diethylenetriamine--adipic acid polyamide solution is diluted with 300 parts of water, heated to 40°C., treated with 27.5 parts of epichlorohydrin, and heated with stirring for about 1 hour at 75°C., until the Gardner-Holdt viscosity rises to a value of E (determined with a sample cooled to 25°C.). The resin is then diluted with 302.5 parts of water and the pH is adjusted to 4.6 with concentrated sulfuric acid. A stabilized resin solution containing about 10% solids is obtained.

EXAMPLE 2

Sufficient NaOH is added to 100 parts of the 10% solids resin solution described in Example 1 to adjust to pH 7. The solution is then combined with 18.7 parts of concentrated (28%) aqueous ammonia and heated under reflux at 80°–85°C. for 2 hours. The resulting solution contains about 10.1% nonvolatile solids.

EXAMPLE 2a

Sufficient NaOH is added to 100 parts of the 10% resin solution prepared according to Example 1 to adjust to pH 7. The solution is then combined with 14.7 parts of concentrated (28%) aqueous ammonia and allowed to react at room temperature (about 25°C.) for one month. A solution containing about 10.1% nonvolatile solids is obtained.

EXAMPLE 3

1000 parts of a 10% solids resin solution, made according to Example 1, is adjusted to pH 7 with NaOH, then treated with 196.9 parts of 28% aqueous ammonia and heated under reflux at 80°C. for 2 hours. The mixture is then distilled until 320.4 parts of resin solution remain in the distilling flask. The resin solution has a nonvolatile concentration of 36.7%, a pH about 7, and a Gardner-Holdt viscosity of W. The resin solution does not gel when stored for 90 days at 32°C.

EXAMPLE 4

14.75 parts of ethylamine are added to 100 parts of a 10% solution of resin described in Example 1. The resulting solution is heated at 70°C. under reflux for 2 hours, then concentrated by evaporation at reduced pressure to remove unreacted ethylamine. The solution is diluted with 75 parts of water to obtain a solution containing about 10.2% total solids.

EXAMPLE 5

200 parts of 50% aqueous diethylenetria mine--adipic acid polyamide solution (made as in Example 1) is diluted with 541) parts of water and treated with 57.5 parts of epichlorohydrin. The mixture is then heated to 70°–75°C. until it reaches a Gardner-Holdt viscosity of about F. The mixture is then diluted with 378 parts of water, cooled, and adjusted to pH 4.7 to give a 12.5% solids resin solution. 160 parts of this resin solution is adjusted to pH 7 with 50% aqueous NaOH, treated with 14.7 parts of 20% aqueous dimethylamine, and heated to 72°C. under reflux for 2 hours. The solution is then concentrated by evaporation to 14.8% nonvolatile solids.

EXAMPLE 6

100 parts of a 10% resin solution prepared according to the method of Example 1 is treated with 6.6 parts of hydroxylamine hydrochloride and 13 parts of 10 N aqueous sodium hydroxide and heated to 85°C. for 2 hours. A resin solution containing about 13.9% total solids is obtained.

EXAMPLE 6a

Example 6 is duplicated except that 9.12 parts of hydroxylamine hydrochloride and 17.4 parts of 10 N aqueous sodium hydroxide are used. A solution containing 14.4% total solids is obtained.

EXAMPLE 6b

Example 6 is duplicated except that 4.56 parts of hydroxylamine hydrochloride and 8.9 parts of 10 N aqueous sodium hydroxide are used. The resulting mixture gels when heated to 80°C.

EXAMPLE 7

151.4 parts of tetraethylenepentamine is diluted with 35 parts of water and treated with 134.8 parts of sebacic acid. The mixture is distilled at 170°–175°C. for about 1.6 hours and 57.1 parts of distillate is collected. The polymer thus prepared is decanted and cooled to room temperature. The polyaminde has a reduced specific visosity (RSV) = 0.244 (determined as in Example 1). 18 parts of this polyamide are dissolved in 40 parts of isopropyl alcohol. The resulting solution is then diluted with 51 parts of water, treateed with 21.9 parts of epichlorohydrin, and heated to 58°–60°C. for 0.2 hour until the mixture reaches a pregel stage. The mixture is then diluted with 100 parts water. 180 parts of this solution is diluted with 150 parts of water and 117 parts of concentrated (28%) aqueous ammonia, and heated for 2 hours under reflux at 70°C. Isopropyl alcohol and unreacted ammonia are removed by stripping under reduced pressure. A solution containing 27.4% nonvolatile solids is obtained.

EXAMPLE 8

116.3 parts of isophthalic acid is added to a mixture of 152.4 parts of tetraethylenepentamine and 40 parts of water. The resulting mixture is heated at 170°–177°C. for 2.75 hours and at 195°–225°C. for 1.1 hours, with evolution of 67.5 parts of distillate, then decanted and cooled. The resulting aminopolyamide has a reduced specific viscosity of about 0.11, measured as described in Example 1. A solution of 15.95 parts of this aminopolyamide in 33 parts of isopropyl alcohol is diluted with 42 parts of water and then treated with 18.5 parts of epichlorohydrin. The mixture is heated to 60°C. for about 0.5 hour, until a pregel stage is reached. The mixture is then diluted with 80 parts of water and 63 parts of isopropyl alcohol, and subsequently treated with 120 parts of concentrated (28%) aqueous ammonia. The resulting mixture is heated at 70°C. under reflux for 2 hours, diluted with 200 parts of water, then evaporated under reduced pressure to remove isopropyl alcohol and unreacted ammonia. A solution containing 9% solids is obtained.

EXAMPLE 9

260.2 parts of itaconic acid is added to a mixture of 200 parts of diethylenetriamine and 200 parts of water. The resulting mixture is heated to 168°–175°C. for about 1.8 hours with evolution of about 257 parts of distillate, then decanted and cooled. The resulting aminopolyamide has a reduced specific viscosity about 0.106 measured as described in Example 1. A solution of 25 parts of this aminopolyamide in 131 parts of water is treated with 11.75 parts of epichlorohydrin. The resulting mixture is heated at 65°C. for 4.4 hours, until it reaches a pregel stage. The resin is diluted with 200 parts of water, then treated with 76.5 parts of concentrated (28%) aqueous ammonia and heated at 80°C. under reflux for 2 hours. Excess ammonia and water are removed at reduced pressure to produce a resin solution containing 16.1% nonvolatile solids.

EXAMPLE 10

175.2 parts of adipic acid is added to a mixture of 61.9 parts of diethylenetriamine, 19.77 parts of 1,3-diaminopropane and 16.2 parts of ethylenediamine. The resulting mixture is heated at 175°C. for 4 hours, while 39.7 parts of distillate is collected. The polymer thus obtained is then diluted with about 220 parts of warm water and stirred to give a 52.1% solution. The polymer has a reduced specific viscosity of about 0.144 (determined as in Example 1). 95.8 parts of this aminopolyamide solution is diluted with 114.7 parts of water, and treated with 15.08 parts of epichlorohydrin. The resulting mixture is heated at 70°–75°C. for 2.75 hours until a pregel stage is reached, then diluted with 500 parts of water and adjusted to pH 4 with sulfuric acid. A solution containing 8.8% nonvolatile solids is obtained.

EXAMPLE 10a 56.8 parts of the resin solution of Example 10 is diluted with 5.7 parts of water and treated with 6.3 parts of concentrated (28%) aqueous ammonia. The mixture is heated at 80°C. under reflux for 2 hours. A solution containing about 7.8% total solids is obtained.

EXAMPLE 11

146.14 parts of adipic acid is added to a mixture of 51.6 parts of diethylenetriamine and 52.1 parts of aminoethylethanolamine. The resulting mixture is heated with stirring at 175°C. for 2 hours, and the distillate is discarded. The resulting aminopolyamide is diluted with about 220 parts of warm water to give a 44.3% solids solution. The resulting aminopolyamide has an RSV = about 0.166 (determined as in Example 1). 101.5 parts of the 44.3% aminopolyamide solution is diluted with 98.4 parts of water, then treated with 12.37 parts of epichlorohydrin and heated to 70°C. When the resin reaches a pregel stage, it is diluted with 400 parts of water. The pH is adjusted with 7.9 parts of concentrated sulfuric acid and 11.4 parts of 50% aqueous sodium hydroxide. A solution containing 10.2% nonvolatile solids is obtained.

EXAMPLE 11a 49 parts of the solution of Example 11 is diluted with 13.5 parts of water and treated with 6.3 parts of concentrated (28%) aqueous ammonia, heated at 75°C. under reflux for 2 hours and cooled. The resulting solution contains about 8.0% solids.

EXAMPLE 12

200 parts of 50% aqueous diethylenetriamine-adipic acid polyamide solution (made as in Example 1) is treated with 55.4 parts of 90% formic acid and 42 parts of 37% formaldehyde, heated slowly to boiling and boiled under reflux for 1 hours. The solution is then cooled, diluted with 180 parts of water, adjusted to pH 8.5, and then treated with 47.9 parts of epichlorohydrin. The resulting mixture is heated to 60°–65°C. for about 1 hour, until the Gardner-Holdt viscosity (of a sample cooled to 25°C.) is about L-M. The resulting solution is cooled and acidified to pH 4.5 to give a resin solution containing 35% nonvolatile solids. The solution does not gel when stored at 32°C. for 90 days.

EXAMPLE 12a

A resin solution is made in accordance with Example 12, except that the resin solution is not stabilized by adjusting to pH 4.5 before storage. The unstabilized resin solution gels within 2 days when stored at 32°C.

EXAMPLE 13

Retention Aide Evaluations

Resins of the above examples are evaluated as retention aids by the following procedures.

A. Alum-free systems.

A blend of 180 parts of Rayonier bleached softwood kraft pulp and 180 parts of Weyerhaeuser bleached hardwood kraft pulp is beaten at 2.5% consistency to 300 cc. Canadian Standard Freeness. 3000 parts of this 2.5% pulp slurry (containing about 75 parts of pulp) is adjusted to pH 8 with 10% NaOH solution, treated with 7.5 parts of kaolin, and stirred for 5 minutes. The resulting slurry is diluted with hard water to 12,000 parts total weight in a proportioner and mixed for 5 minutes. 500 parts of this diluted slurry is treated with 5, 15 and 50 parts of a 0.005% solution of resin, respectively representing 0.01, 0.03 and 0.1% by weight of pulp. The resin-treated slurry is stirred 30 seconds, diluted to 5000 parts total with water, and formed into a handsheet in the deckle box of a Noble-Wood handsheet machine.

B. Alum-containing systems

A blend of 180 parts of Rayonier bleached softwood kraft pulp and 180 parts of Weyerhaeuser bleached hardwood kraft pulp is beaten at 2.5% consistency to 300 cc. Canadian Standard Freeness. 3000 parts of this 2.5% pulp slurry (containing 75 parts of pulp) is adjusted to pH 6.5 with 10% $H_2SO_4$, then treated with 8.2 parts of 9.1% alum solution. The slurry is then adjusted to pH 4.5 with 10% $H_2SO_4$ or NaOH as necessary. The slurry is treated with 7.5 parts kaolin and stirred for 5 minutes. The resulting slurry is diluted with hard water to 12,000 parts total weight in a proportioner and mixed for 5 minutes. 500 parts of this diluted slurry is treated with 5, 15 and 50 parts of a 0.005% solution of resin, respectively representing 0.01, 0.03 and 0.1% by weight of pulp. The resin-treated slurry is stirred 30 seconds, diluted to 5000 parts total with water, and formed into a handsheet in the deckle box of a Noble-Wood hand sheet machine.

Ash determinations are made on the handsheets. The percentage filler retention is calculated from the percent ash by the following formula:

$$\frac{(\% \text{ Ash} - \% \text{ Pulp Ash}) \times 100}{\left(\frac{\% \text{ Filler}}{100}\right) \times \% \text{ Filler Ash}} = \text{Retention of Filler}$$

where % Pulp Ash = 0.2, % Filler Ash = 85.5 for kaolin and 99 for titanium dioxide, and % Filler = 10.

EXAMPLE 14

Tensile Strength Evaluations

Pulp, either Rayonier bleached softwood kraft (RBK) pulp or a 50:50 blend of RBK and Weyerhaeuser bleached hardwood kraft (WBHK) pulp, is beaten at 2.5% consistency to 500 cc. Canadian Standard Freeness, at pH 7.5. 2000 parts of this stock (50 parts of pulp solids) is diluted with water to a total of 18.000 parts in the proportioner of a Noble-Wood handsheet machine to give a ca. 0.28% pulp slurry. Resins are added, as 2% aqueous solutions, in amounts calculated to give 1.0% resins solids based on pulp solids. 1000 parts of the resin-treated 0.28% slurry is then diluted with 10,000 parts of water in the deckle box to a consistency of 0.025% and formed into handsheets. The handsheets are wet pressed to about 35% solids, and dried on a drum drier at 105°–110°C. for about 40 seconds. "Cured" sheets are further heated in a convection oven for 1 hour at 105°C. Dry tensile strengths are determined on an Amthor tensile tester after conditioning the sheets for 24 hours at 73°F. at 50% relative humidity. Wet tensiles are determined after soaking tensile strips in distilled water for 2 hours.

The results of the retention aid and wet strength evaluations are shown in the following tables.

TABLE 1

RETENTION AID EVALUATIONS
KAOLIN FILLER IN ALUM SYSTEM

Percentage Filler Retained

| Resin of Example | No Resin | 0.01% Resin | 0.03% Resin | 0.10% Resin |
|---|---|---|---|---|
| 1 | 27 | 46 | 54 | 56 |
| 2 | 27 | 48 | 56 | 60 |
| 3 | 30 | 56 | 60 | 67 |
| 4 | 31 | | 42 | |
| 5 | 31 | | 46 | |
| 6 | 32 | 50 | 57 | 58 |
| 6a | 32 | 48 | 48 | 53 |
| 7 | 31 | | 57 | |
| 8 | 31 | | 60 | |
| 9 | 31 | | 59 | |
| 10a | 31 | | 39 | |
| 11a | 31 | | 56 | |
| 12 | 32 | 50 | 56 | 56 |

TABLE 2

RETENTION AID EVAULATIONS
KAOLIN FILLER IN ALUM-FREE SYSTEM

Percentage Filler Retained

| Resin of Example | No Resin | 0.01% Resin | 0.03% Resin | 0.10% Resin |
|---|---|---|---|---|
| 1 | 17 | 22 | 35 | 50 |
| 2 | 17 | 31 | 51 | 67 |
| 3 | 17 | 27 | 54 | 71 |
| 4 | 17 | | 24 | |
| 5 | 17 | | 31 | |
| 7 | 17 | | 47 | |
| 8 | 17 | | 49 | |
| 9 | 17 | | 45 | |
| 11a | 17 | | 25 | |
| 12 | 16 | 23 | 41 | 59 |

TABLE 3

WET STRENGTH EVALUATIONS

Tensiles, lb./in. width

| Resin of Example | Pulp | Basis Weight lb./3000 ft.² of sheet | Wet Strength Uncured | Cured |
|---|---|---|---|---|
| No resin | 50:50 RBK:WBHK | 40.9 | 0.44 | 0.54 |
| 1 | | 39.4 | 3.75 | 6.10 |
| 3 | | 40.5 | 2.16 | 2.96 |
| 4 | | 40.1 | 0.56 | 0.78 |
| 5 | | 39.9 | 0.48 | 0.74 |
| 7 | | 39.7 | 1.75 | 2.35 |
| 8 | | 39.4 | 1.76 | 2.30 |
| 9 | | 39.5 | 1.69 | 2.20 |
| 10a | | 40.4 | 0.59 | 0.70 |
| 10 | | 39.9 | 3.10 | 4.35 |
| 11a | | 40.5 | 1.45 | 2.10 |
| 11 | | 40.1 | 3.45 | 4.85 |
| None | RBK | 39.9 | 0.59 | 0.65 |
| 1 | | 39.9 | 4.35 | 7.35 |
| 2a | | 39.8 | 1.95 | 2.65 |
| 12 | | 40.1 | 3.15 | 3.65 |

Retention Aid Resins Derived from Polyaminopolyureylene--epichlorohydrin Base Resin and Nitrogen Compound In accordance with another aspect of this invention, the retention aid resin is derived by reaction of the nitrogen compound and a polyaminopolyureylene---epichlorohydrin base resin. Polyaminopolyureylene---epichlorohydrin resins are disclosed and described in U.S. Pat. 3,240,644, reference to which is hereby made.

The polyaminopolyureylenes (sometimes called "aminopolyureylenes" and sometimes "polyaminoureylenes") used in the preparation of the retention aid resins of this invention are water-soluble materials containing tertiary amine groups and/or mixtures of tertiary amine groups with primary and/or secondary amine groups and/or quaternary ammonium groups. However, tertiary amine groups should account for at least 70% of the basic nitrogen groups present in the polyaminopolyureylene. These polyaminopolyureylenes can be prepared by reacting urea with certain polyamines containing tertiary amine groups. The reaction can, if desired, be carried out in a suitable solvent such as xylene.

The polyamine reactant will have at least three amine groups, at least one of which is a tertiary amine group and at least two of which contain an active hydrogen. It may also have secondary amine groups in limited amounts. Polyamines that can be used are methyl bis(3-aminopropyl)amine; methyl bis(2-aminoethyl)amine; N-(2-aminoethyl)piperazine; 4,7-dimethyltriethylenetetramine; ethyl bis(3-aminopropyl)amine; and dodecyl bis(2-aminoethyl)amine. Mixtures of two or more can be employed if desired.

Temperatures employed for carrying out reaction between urea and the polyalkylene polyamine can vary from about 125°C. to about 250°C. at atmospheric pressure. Temperatures between about 160°C. and about 225°C. are preferred. The time of reaction will vary depending upon temperature but will usually be from about ½ hour to about 4 hours (time varies inversely with temperature). In any event, the reaction is desirably continued to substantial completion.

In carrying out the reaction between urea and the polyamine, it is preferred to use a mole ratio of polyamine to urea of about 1::1. However, mole ratios from about 0.7:1 to about 1.5:1 can be used.

The polyaminopolyureylene is reacted with epichlorohydrin at a temperature from about 25°C. to about 80°C., and preferably at a temperature from about 35°C. to about 50°C., until the viscosity of a 25% solids solution at 25°C. has reached about B or higher (short of gelation) on the Gardner-Holdt scale. For the purposes of this invention a gelled product is undesirable. Reaction is preferably carried out at solids concentrations (includes both reactants from about 20% to about 50% to moderate the reaction and also is preferably carried out in aqueous medium including mixtures of water and a water-miscible solvent (such as ethanol) that is nonreactive to the reactants and to the reaction product under reaction conditions. The reaction may also be moderated by decreasing the pH of the aqueous polyaminopolyureylene solution with acid prior to addition of epichlorohydrin or immediately after the addition of epichlorohydrin. This adjustment is usually made to pH 8.5–9.5 but may be made to as low as pH 7.5. When the desired viscosity is reached, the product is cooled to about 25°C.

In the epichlorohydrin--polyaminopolyureylene reaction, it is preferred to use a mole ratio of epichlorohydrin to amine groups in the polyaminopolyureylene of from about 1.0:1 to about 1.7:1. In general, satisfactory results can be obtained utilizing from about 0.8 mole to about 2.0 moles of epichlorohydrin for each amine group of the polyaminopolyureylene.

The resulting product is then reacted with a nitrogen compound in accordance with this invention to produce a retention aid resin having little, if any, thermosetting properties. If the base resin is to be stored for any length of time prior to reaction with the nitrogen compound, it can be stabilized against gelation by adding to the aqueous solution thereof sufficient water-soluble acid (such as hydrochloric and sulfuric acid) to obtain and maintain the pH at about 2. The product stabilized against gelation can be reacted with a nitrogen compound in accordance with this invention to produce a retention aid resin having little, if any, thermosetting properties or if desired, the stabilized product can be reactivated by known means prior to reaction with the nitrogen compound. Polyaminopolythioureylene--epichlorohydrin resins can also be employed as a base resin in the preparation of the retention aid resins of this invention.

The following examples are illustrative of this aspect of the invention. In these examples all parts and percentages are by weight unless otherwise specified.

EXAMPLE 15

A mixture of 290 parts of methyl-bis(3-aminopropyl)amine and 120.1 parts of urea is heated to 180°C. for 1 hour, then diluted with about 500 parts of water to give a 40.6% solids solution of aminopolyureylene. 271 parts of this solution is diluted with 321 parts of water and acidified with 28.9 parts of 10 N aqueous hydrochloric acid. The resulting solution is treated with 89.2 parts of epichlorohydrin and held between 40° and 50°C. for about 1 hour, until the Gardner-Holt viscosity increases to about L. The resin solution is stabilized by treatment with 52 parts of 10 N hydrochloric acid, followed by heating at 65°C. for 1.5 hours while adding about 8 parts of additional hydrochloric acid periodically as needed to maintain the pH at or below 2.0. A resin solution is obtained containing about 27% nonvolatile solids. This solution does not gel when stored for 90 days at 32°C.

EXAMPLE 16

Fifty parts of a resin solution made according to the procedure of Example 15 is reactivated by mixing with a solution of 2.24 parts of sodium hydroxide in 49 parts of water, and aging for 0.5 hours. The resulting solution is then diluted with 300 parts of water, combined with 54 parts of concentrated (28%) aqueous ammonia solution, and allowed to react for 2 months at 20°–24°C.

EXAMPLE 17

25 parts of resin solution made according to Example 15 is reactivated by mixing with a solution of 1.12 parts of sodium hydroxide in 49 parts of water and aging 0.5 hour. 4.7 parts of hydroxylamine hydrochloride, 8.8 parts of 10 N aqueous sodium hydroxide and 150 parts of water are added. The resulting solution is heated to 70°C. for 12 minutes then diluted with 117 parts of water containing 3.7 parts of concentrated sulfuric acid to give a solution containing about 7.1% solids.

EXAMPLE 18

The resins prepared in Examples 16 and 17 are evaluated as retention aids using the procedure described in Example 13, except that RBK pulp is used in the evaluation of the resin of Example 16.

Example 19

The resin prepared in Example 15, and reactivated by mixing with a solution of 2.24 parts of NaOH in 49 parts of water and aging for 0.5 hour, and the resin prepared in Example 16 are evaluated as wet-strength agents using the procedure described in Example 14. This illustrates the reduced wet strength imparted to paper by the resin of Example 16 compared to that of the base resin of Example 15.

TABLE 4

RETENTION AID EVALUATIONS: KAOLIN FILLER IN ALUM SYSTEM

| Resin of Example | No Resin | 0.01% Resin | 0.03% Resin | 0.10% Resin |
|---|---|---|---|---|
| | | Percentage Filler Retained | | |
| 16 | 30 | 60 | 67 | 57 |
| 17 | 32 | 49 | 64 | 68 |

TABLE 5

RETENTION AID EVALUATIONS: KAOLIN FILLER IN ALUM-FREE SYSTEM

| Resin of Example | No Resin | 0.01% Resin | 0.03% Resin | 0.10% Resin |
|---|---|---|---|---|
| | | Percentage Filler Retained | | |
| 16 | 12.5 | 37 | 58 | 72 |
| 17 | 16 | 27 | 48 | 67 |

TABLE 6

WET STRENGTH EVALUATIONS

| Resin of Example | Pulp | Basis Weight lb./3000 ft.$^2$ of sheet | Wet Strength Uncured | Wet Strength Cured |
|---|---|---|---|---|
| | | | Tensiles lb./in. width | |
| No resin | RBK | 39.9 | 0.59 | 0.65 |
| 15 | RBK | 40.2 | 5.94 | 7.30 |
| 16 | RBK | 39.5 | 2.25 | 2.70 |

Retention Aid Resins Derived from Poly(diallylamine)--Epihalohydrin Base Resin and Nitrogen Compound In accordance with another aspect of this invention a retention aid resin is derived by reaction of the nitrogen compound and a poly(diallylamine)--epihalohydrin base resin. Base resins of this type are disclosed and described in U.S. Pat. No. 3,700,623, reference to which is hereby made.

The poly(diallylamine)--epihalohydrin base resin used to prepare the retention aid resins of this invention comprises the resinous reaction product of (A) a linear polymer having units of the formula

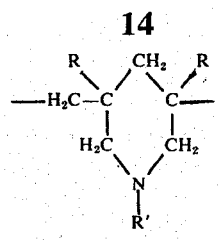

(I)

where R is hydrogen or lower alkyl and R' is hydrogen, alkyl or a substituted alkyl group and (B) an epihalohydrin.

In the above formula, each R can be the same or different and, as stated, can be hydrogen or lower alkyl. The alkyl groups contain from 1 to 6 carbons and are preferably methyl, ethyl, isopropyl or n-butyl. R' of the formula represents hydrogen, alkyl or substituted alkyl groups. The R' alkyl groups will contain from 1 to 18 carbon atoms (preferably from 1 to 6 carbon atoms) such as methyl, ethyl, propyl, isopropyl, butyl, tert-butyl, hexyl, octyl, decyl, dodecyl, tetradecyl, and octadecyl. R' can also be a substituted alkyl group. Suitable substituents include, in general, any group which will not interfere with polymerization through a vinyl double bond. Typically, the substituents can be carboxylate, cyano, ether, amino (primary, secondary or tertiary), amide hydrazide and hydroxyl.

Polymers having units of the above formula can be produced by polymerizing the hydrohalide salt of a diallylamine (II)

$$R-\underset{CH_2}{\overset{CH_2}{\underset{\|}{C}}}\quad \underset{CH_2}{\overset{CH_2}{\underset{\|}{C}}}-R$$
$$\diagdown N \diagup$$
$$|$$
$$R'$$

where R and R' are as indicated above, either alone or as a mixture with other copolymerizable ingredients, in the presence of a free radical catalyst and then neutralizing the salt to give the polymer free base.

Specific hydrohalide salts of the diallylamines which can be polymerized to provide the polymer units of the invention include diallylamine hydrochloride; N-methyldiallylamine hydrobromide; 2,2'dimethyl-N-methyldiallylamine hydrochloride, N-ethyldiallylamine hydrobromide; N-isopropyldiallylamine hydrochloride; N-n-butyldiallylamine hydrobromide; N-tert-butyldiallylamine hydrochloride; N-n-hexyldiallylamine hydrochloride; N-octadecyldiallylamine hydrochloride; N-acetamidodiallylamine hydrochloride; N-cyanomethyldiallylamine hydrochloride; B-β-propionamidodiallylamine hydrobromide; N-carboethoxymethyldiallylamine hydrochloride; N-β-methoxyethyldiallylamine hydrobromide; N-β-aminoethyldiallylamine hydrochloride; N-hydroxyethyldiallylamine hydrobromide; and N-acetohydrazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N- methyldiallylamine can be prepared by reaction of two moles of an allyl halide, such as allyl chloride, with one mole of methylamine in the presence of an ionization catalyst such as one of those enumerated above.

In preparing the homopolymers and copolymers for use in this invention, reaction can be initiated by redox catalytic system. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin to form the base resin of this aspect of the invention can contain different units of formula (I) and/or contain units of one or more other copolymerizable monomers. Typically, the comonomer is a different diallylamine, a monoethylenically unsaturated compound containing a single vinylidene group or sulfur dioxide, and is present in an amount ranging from 0 to 95 mole % of the polymer. Thus the polymers of diallylamine are linear polymers wherein from 5% to 100% of the recurring units have the formula (I) and from 0 to 95% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones such as methyl vinyl ketone and ethyl vinyl ketone, vinyl sulfonamide, sulfur dioxide or a different diallylamine embraced by the above formula (II).

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The poly(diallylamine)--epihalohydrin base resin of the invention can be prepared by reacting a homopolymer or copolymer of a diallylamine as set forth above with an epihalohydrin at a temperature of from about 30°C. to about 80°C. and preferably from about 40°C. to about 60°C. until the viscosity measured on a solution containing 20% to 30% solids at 25°C. has reached a range of A to E and preferably about C to D on the Gardner-Holdt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25°C.)

In preparing the retention aid resins in accordance with this aspect of the invention, the reaction of the nitrogen compound with the poly(diallylamine)---epihalohydrin base resin preferably takes place in aqueous medium. The reaction with the nitrogen compound can be carried out promptly after preparation of the base resin solution. If the base resin solution is to be stored for any lengh of time prior to reaction with the nitrogen compound, it should be stabilized against gelation.

The base resin can be stabilized against gelation by adding to the aqueous solution thereof sufficient water-soluble acid (such as hydrochloric acid and sulfuric acid) to obtain and maintain the pH at about 2. The resin solution, stabilized against gelation, can be reacted with a nitrogen compound in accordance with this invention to produce a retention aid resin having little, if any, thermosetting properties, or, if desired, the stabilized product can be reactivated by known means prior to reaction with the nitrogen compound.

The following examples are illustrative of this aspect of the invention. In these examples all parts and percentages are by weight unless otherwise specified.

EXAMPLE 20

A solution of 69.1 parts of methyldiallylamine and 197 parts of 20° Be hydrochloric acid in 111.7 parts of demineralized water is sparged with nitrogen to remove air, then treated with 0.55 part of tertiary butyl hydroperoxide and a solution of 0.0036 part of ferrous sulfate in 0.5 part of water. The resulting solution is allowed to polymerize at 60°–69°C. for 24 hours, to give a polymer solution containing about 52.1% solids, with an RSV of 0.22. 122 parts of the above solution is adjusted to pH 8.5 by the addition of 95 parts of 3.8% sodium hydroxide and then diluted with 211 parts of water, and combined with 60 parts of epichlorohydrin. The mixture is heated at 45°–55°C. for 1.35 hours, until the Gardner-Holdt viscosity of a sample cooled to 25°C reaches B+. The resulting solution is acidified with 25 parts of 20° Be hydrochloric acid and heated at 60°C. until the pH becomes constant at 2.0. The resulting resin solution has a solids content of 20.8% and a Brookfield viscosity = 77 cp. (measured using a Brookfield Model LVF Viscometer, No. 1 spindle at 60 r.p.m. with guard).

25 parts of a 9.58% solids solution of the resin described above is combined with a solution of 1.62 parts of 10 N sodium hydroxide in 11.25 parts of water and aged 0.5 hours. The resulting solution is diluted with 25 parts of water, combined with 12.1 parts of concentrated (28%) aqueous ammonia, and allowed to react for one month at 25°C.

EXAMPLE 21

58 parts of HCl-stabilized poly(methyldiallylamine)--epichlorohydrin resin, made according to Example 20 and further diluted to 9.58% solids is reactivated by mixing with a solution of 1 part of sodium hydroxide in 221 parts of water and aged for 0.5 hour to give a 2% solids solution.

EXAMPLE 22

The resin prepared in Example 20 is evaluated as a retention aid using the procedure described in Example 13, except that RBK pulp is used.

EXAMPLE 23

The resins prepared in Examples 20 and 21 are evaluated as wet strength agents using the procedure described in Example 14. This illustrates the reduced wet strength imparted to paper by the resin of Example 20 compared to the base resin of Example 21.

TABLE 7

RETENTION AID EVALUATIONS

| Resin of Example | Filler | Percentage Filler Retained | | | |
|---|---|---|---|---|---|
| | | No Resin | 0.01% Resin | 0.03% Resin | 0.10% Resin |
| 20 | Kaolin + Alum | 22 | 33 | 38 | 42 |
| 20 | Kaolin (No Alum) | 11 | 17 | 35 | 49 |

TABLE 8

WET STRENGTH EVALUATIONS

Tensiles, lb./in. width

| Resin of Example | Pulp | Basis Weight lb./3000 ft.³ of sheet | Wet Strength | |
|---|---|---|---|---|
| | | | Uncured | Cured |
| None | RBK | 39.9 | 0.59 | 0.65 |
| 20 | RBK | 39.6 | 1.95 | 2.35 |
| 21 | RBK | 41.4 | 6.44 | 6.34 |

The poly(diallylamine)--epichlorohydrin base resins can be prepared in accordance with the procedure of Netherlands patent No. 7,112,855 if desired, and employed as a reactant in this invention in either their activated or inactivated form.

While the above resins have been described and exemplified in connection with their use as retention aids for paper fillers, they may also be used for various other purposes such as flocculants for clarifying aqueous suspensions of clay, industrial waste, mineral fillers, cellulose fines, and sewage, as well as chelating agents for metallic ions, treatment of cooling tower surfaces and antifoulants for metal surfaces in contact with water, as in heat exchangers. They are also useful as tissue creping aids.

What we claim and desire to protect by Letters Patent is:

1. A cationic water soluble resin consisting essentially of the reaction product of (1) a water soluble or water dispersible polyaminopolyamide--epihalohydrin base resin having epoxide moieties and (2) a nitrogen compound in an amount at least stoichiometrically equivalent to the epoxide moieties of the base resin, said base resin consisting essentially of the reaction product of a dicarboxylic acid selected from the group consisting of diglycolic acid, saturated aliphatic dicarboxylic acids containing from 4 through 12 carbon atoms, aromatic carbocyclic dicarboxylic acids and alpha, beta-ethylenically unsaturated dicarboxylic acids and anhydrides thereof, lower alkyl esters and amides thereof, with a polyalkylene polyamine selected from the group consisting of 1,4-bis-(3-aminopropyl) piperazine, 1-(2-aminoethyl) piperazine and polyalkylene polyamines of the formula

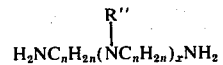

wherein R'' is hydrogen, $C_1$–$C_{12}$ alkyl, or $C_1$–$C_{12}$ hydroxyalkyl; n is an integer 2 through 6 and x is an integer 1 through 4, in a mole ratio of polyalkylene polyamine to dicarboxylic acid of from about 0.9:1 to about 1.2:1 to form a polyaminopolyamide and reacting the polyaminopolyamide with epihalohydrin in a mole ratio of epihalohydrin to amine groups of said polyaminopolyamide of from about 0.1 mole to about 2 moles, said nitrogen compound having the formula RRR'N wherein R is independently selected from the group consisting of hydrogen and $C_1$–$C_4$ alkyl and wherein R' is selected from the group consisting of hydrogen, hydroxyl and $C_1$–$C_4$ alkyl, and said reaction between (1) and (2) being carried out at a temperature of from about 0°C. to about 150°C. and until substantially all epoxide moieties of the base resin have reacted with the nitrogen compound.

2. The resin of claim 1 wherein the nitrogen compound is ammonia.

3. The resin of claim 1 wherein the nitrogen compound is ethyl amine.

4. The resin of claim 1 wherein the nitrogen compound is dimethyl amine.

5. The resin of claim 1 wherein the nitrogen compound is hydroxyl amine.

6. The resin of claim 1 wherein the base resin is a polyaminopolyamide--epichlorohydrin resin, the amount of nitrogen compound is from about 2 times to about 40 times the amount required for stoichiometric equivalence of the epoxide moieties, and reaction temperature is from about 50°C. to about 100°C.

7. The resin of claim 6 wherein the nitrogen compound is ammonia.

8. The resin of claim 6 wherein the polyaminopolyamide moiety of the polyaminopolyamide--epichlorohydrin resin is the reaction product of adipic acid and diethylenetriamine.

9. The resin of claim 7 wherein the polyaminopolyamide moiety of the polyaminopolyamide--epichlorohydrin resin is the reaction product of adipic acid and diethylenetriamine.

* * * * *